Aug. 10, 1954

V. T. STACK

AUTOMATIC STITCH LENGTH CONTROL
MECHANISM FOR KNITTING MACHINES 2,685,786

Filed Jan. 23, 1953

INVENTOR.
Vernon Thomas Stack,
BY Paul & Paul
ATTORNEYS.

Aug. 10, 1954

V. T. STACK 2,685,786

AUTOMATIC STITCH LENGTH CONTROL
MECHANISM FOR KNITTING MACHINES

Filed Jan. 23, 1953

*INVENTOR.*
Vernon Thomas Stack,
BY Paul & Paul
ATTORNEYS.

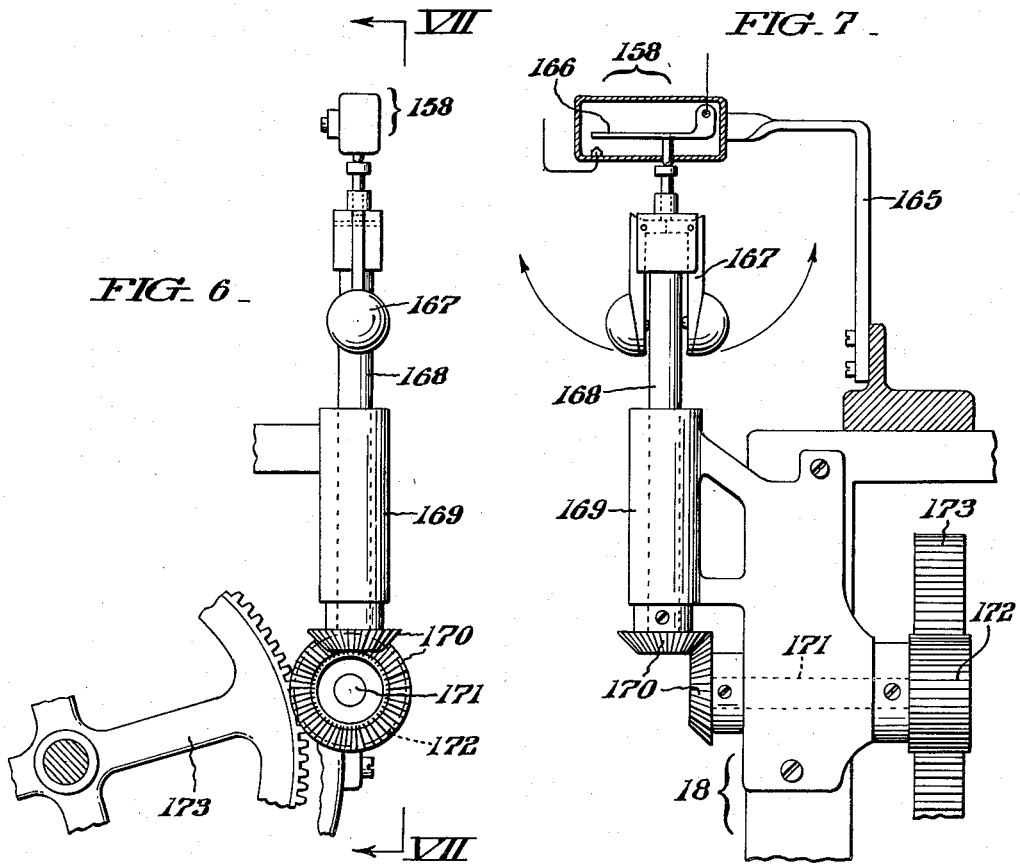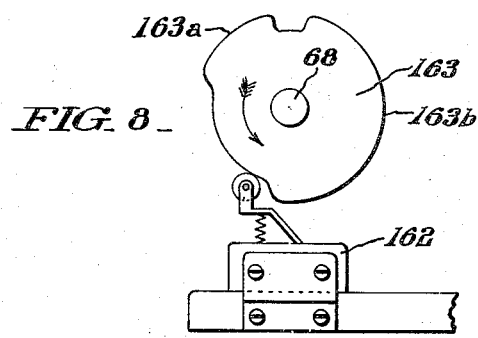

Aug. 10, 1954
V. T. STACK
2,685,786
AUTOMATIC STITCH LENGTH CONTROL MECHANISM FOR KNITTING MACHINES
Filed Jan. 23, 1953
7 Sheets-Sheet 6
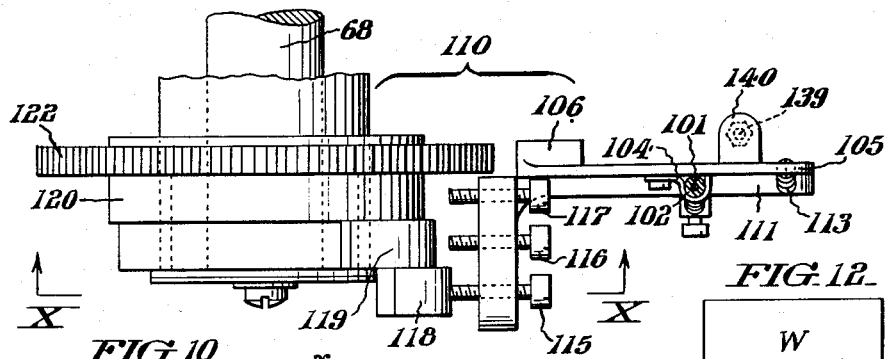
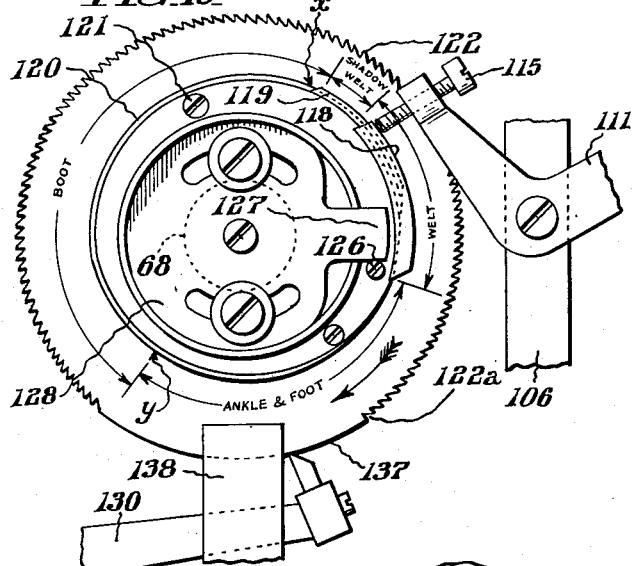
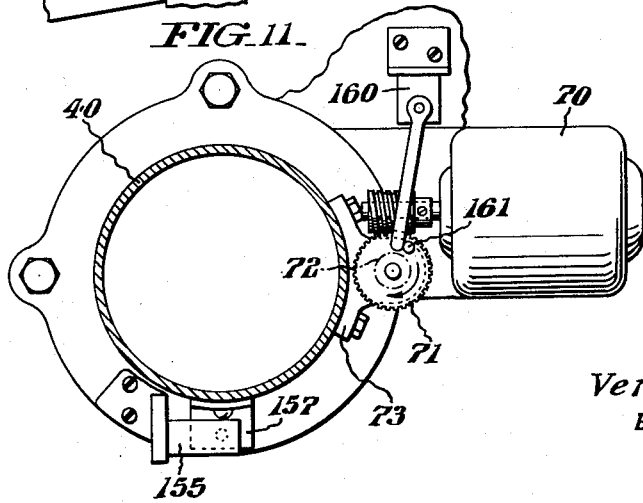
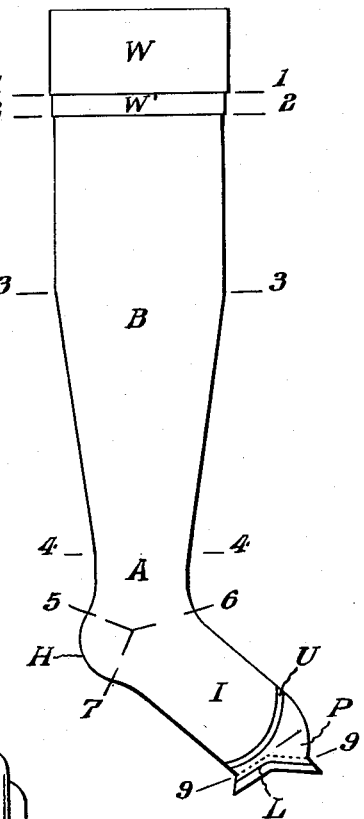
INVENTOR.
Vernon Thomas Stack,
BY Paul & Paul
ATTORNEYS.

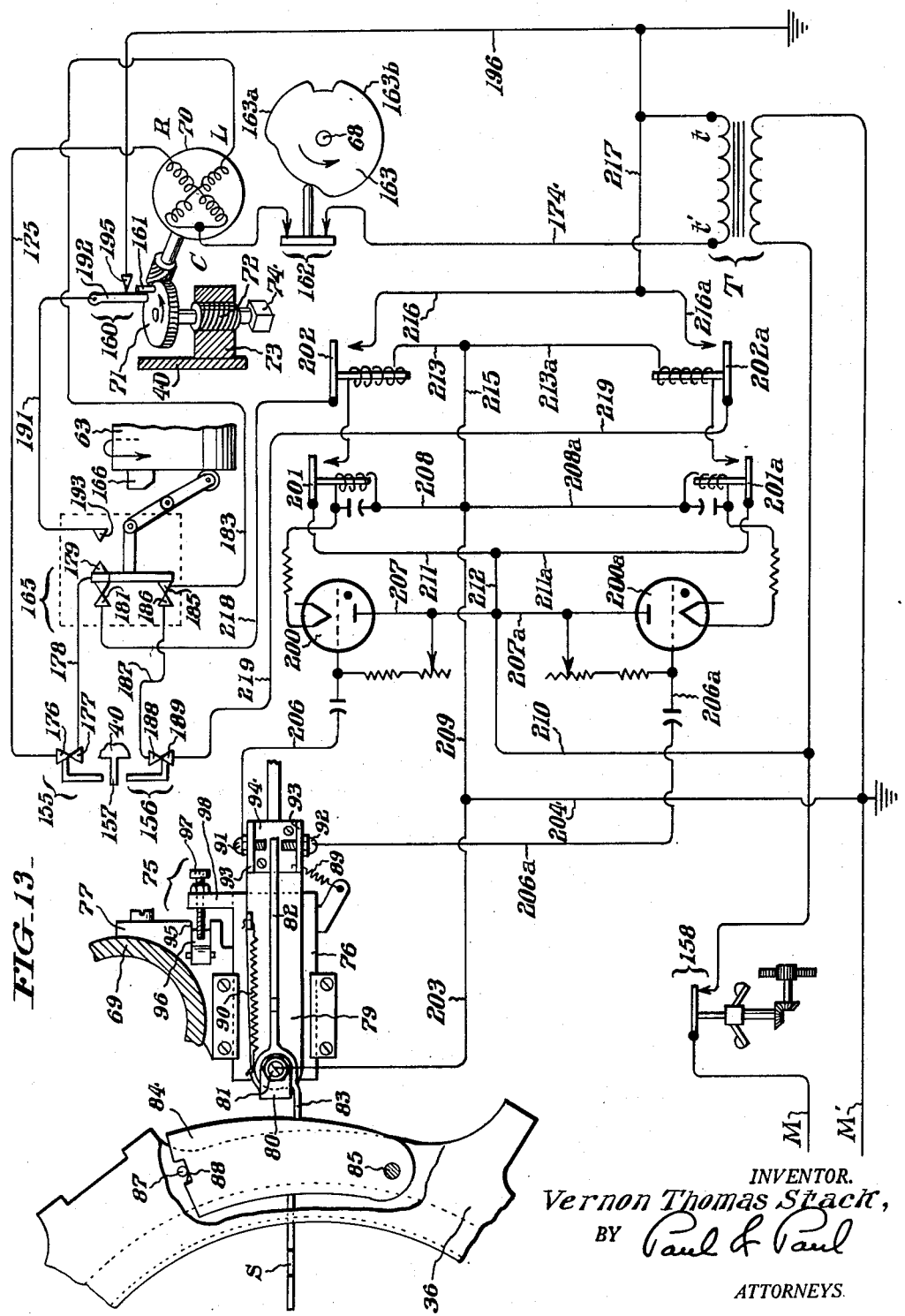

Patented Aug. 10, 1954

2,685,786

UNITED STATES PATENT OFFICE 2,685,786

AUTOMATIC STITCH LENGTH CONTROL MECHANISM FOR KNITTING MACHINES

Vernon Thomas Stack, Walkertown, N. C., assignor to Hanes Hosiery Mills Company, Winston-Salem, N. C., a corporation of North Carolina Application January 23, 1953, Serial No. 332,800

26 Claims. (Cl. 66—50)

1

This invention relates to stitch length or loop size control mechanism useful more particularly in connection with circular knitting machines such as are commonly used in the commercial production of seamless hosiery and the like, having a needle cylinder with a complement of independent needles and cooperative sinkers, knitting cams for actuating the needles, and means for rotating and/or oscillating the cylinder relative to the cams or vice versa. In the production of ladies' hosiery by machines of the kind referred to, the boot or leg portions are shaped by gradual reduction in the size of the fabric loops as the knitting proceeds, this alteration in loop size being effected by progressively changing the vertical relationship between the needle cylinder (which carries the sinkers) and the knitting cams. However, stockings successively knitted on circular knitting machines, as ordinarily constructed, differ considerably in length due to variations in the yarns and the tension maintained thereon as it is fed to the needles, with consequent formation, in individual courses, of loops which differ in size and/or contour causing, in addition to varying stocking lengths, streaks, shadow lines or rings which detract from the marketable value of the stockings.

The chief aim of my invention is to overcome the above mentioned drawbacks, that is to say, to make possible successive production, upon circular knitting machines, of stockings which are alike from the standpoint of length, in which the loops of individual courses are regular in contour and uniform in size, and moreover, in which the loops are accurately and evenly graduated as between successive courses of the leg for attainment of perfect shaping.

These objectives are realized in practice, as hereinafter more fully disclosed, through provision of a relatively simple and reliable automatic mechanism which, in cooperation with the sinkers of the knitting machine, not only functions during the knitting of individual fabric courses to change the vertical relationship between the needle cylinder and the knitting cams by infinitesimal degrees to insure the formation of regular loops of uniform size in individual courses of the fabric, but also during the knitting of the leg portions of the stockings to bring about changes in the aforesaid relationship progressively to greater extents for graduation in the size of the loops as between successive courses.

Other objects and attendant advantages will appear from the following detailed description of the attached drawings, wherein:

2

Fig. 6 is a fragmentary view in vertical section taken as indicated by the angled arrows VI—VI in Fig. 1.

Fig. 7 is a fragmentary view in elevation looking as indicated by the angled arrows VII—VII in Fig. 6.

Fig. 8 is a fragmentary view in elevation looking as indicated by the angled arrows VIII—VIII in Fig. 1.

Fig. 9 is a fragmentary detail view in section taken as indicated by the angled arrows IX—IX in Fig. 2 and drawn to a larger scale.

Fig. 10 is a fragmentary view in elevation looking as indicated by the angled arrows X—X in Fig. 9.

Fig. 11 is a horizontal section taken as indicated by the angled arrows XI—XI in Fig. 2.

Fig. 12 shows a seamless stocking blank produced in accordance with my invention; and Fig. 13 is a view like Fig. 3 showing an alternative control circuit.

Figure 1:
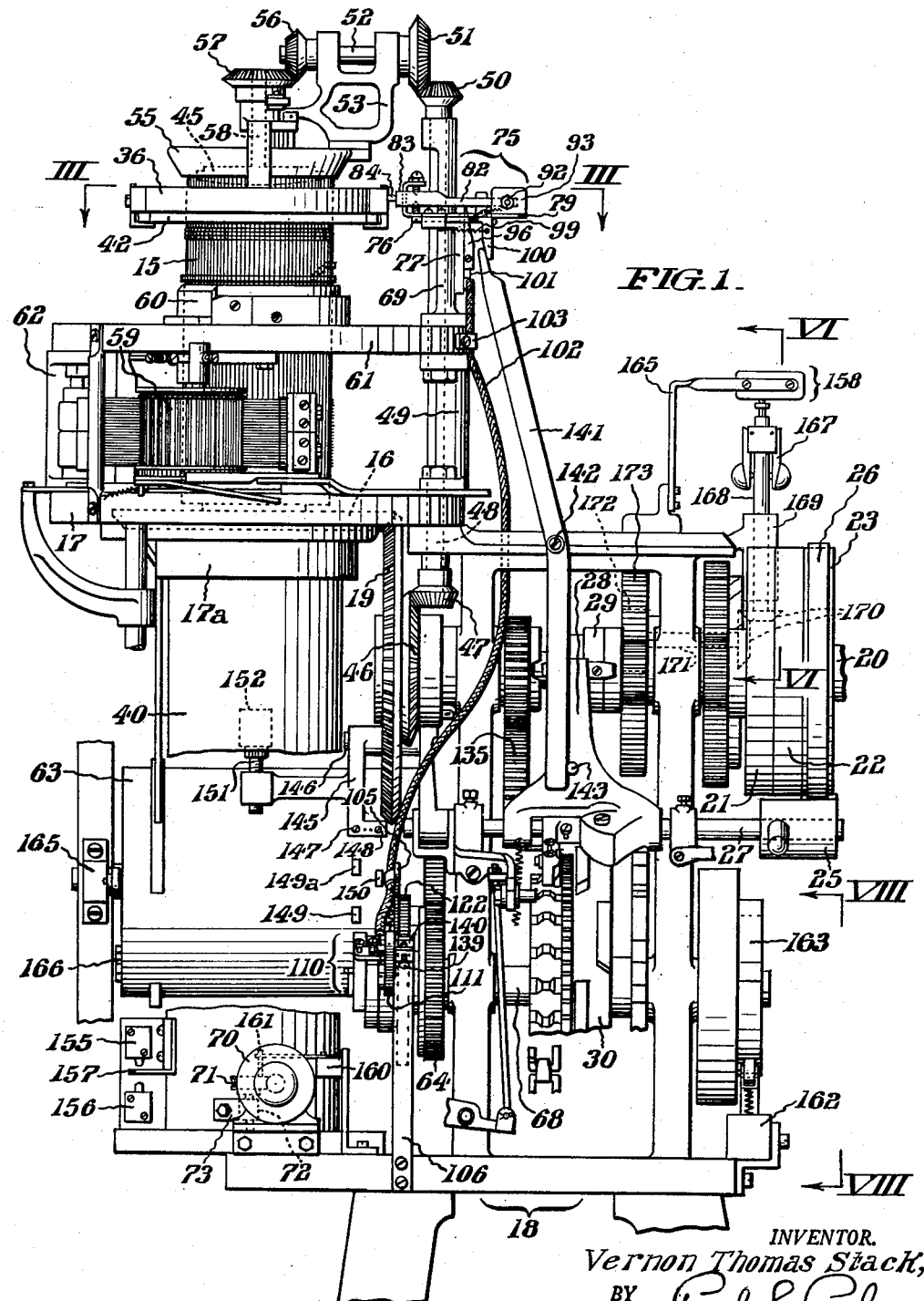
Fig. 1 is a view in front elevation of a circular stocking machine with automatic stitch length control mechanism conveniently embodying my invention, a portion of the machine being broken out to expose important parts which otherwise would be hidden.

The machine chosen for convenience of exemplifying my invention is of the well known Scott and Williams type whereof the rotary needle cylinder 15 is mounted, with capacity for slight independent up and down axial movement, upon a bevel gear 16 which is recessed for rotation in a bed 17 at the top of the machine frame 18. Gear 16 is in mesh with a bevel gear 19 on main shaft 20 which carries the high speed, low speed and loose pulleys 21, 22 and 23 respectively. The shipper 25 for the belt 26 is mounted as usual on a slide bar 27 whereto is secured the shifter fork 28 for the clutch collar 29, said fork being controlled from the main timing drum 30 for impartation of oscillatory movements of the needle cylinder during the heel and toe knitting phases, and said drum being intermittently shogged about through a complete revolution for each knitting cycle of the machine in a well known manner. The usual non-ratating stocking receiving column or tube, designated 40 in Figs. 1 and 2, engages upwardly with a slide fit into a pendent boss 17a of bed 17; and interposed between the top of said tube and the bottom of needle cylinder 15, is a plurality of annularly spaced upright pins 41 which are axially slidable in the bevel gear 16 and upon which the cylinder rests. Accordingly, by up or down movements imparted to tube 40 and cylinder 15, and hence to the sinkers S (Figs. 3 and 4) carried in the sinker ring 42 around the upper end of said cylinder, are raised or lowered by corresponding amounts, with consequent lengthening or shorting fabric loops as well understood in the art. For the purpose of producing long welt top ladies' stockings, the machine is provided with the usual welting dial 45 which is positioned within the upper end of cylinder 15. The dial 45 is rotated in unison with needle cylinder 15 by a drive system including another bevel gear 46 on pulley shaft 20, which meshes with a bevel pinion 47 at the lower end of a vertical shaft 48 rotatively borne in a fixed upstanding post 49 on bed 17. A bevel pinion 50 at the upper end of shaft 48 meshes with a bevel wheel 51 at outer end of a horizontal shaft 52 rotatively supported in a bracket 53 on the usual needle latch guard ring 55 of the machine. A bevel pinion 56 at the inner end of horizontal shaft 52 meshes in turn with a bevel gear 57 at the top end of the shaft 58 of welting dial 45, the latter shaft being also rotatively supported in bracket 53. The machine is also provided in this instance with a patterning drum 59 for selecting individual needles for tucking or other special stitching. The knitting cams (not shown) are mounted within a ring 60 on a circular bed 61 sustained at an elevation above bed 17 by columns 62, and the supplemental timing drum 63 of the machine is intermittently rotated with main drum 30 through gearing 64, from the shaft 68 of the latter drum.

Figure 3:
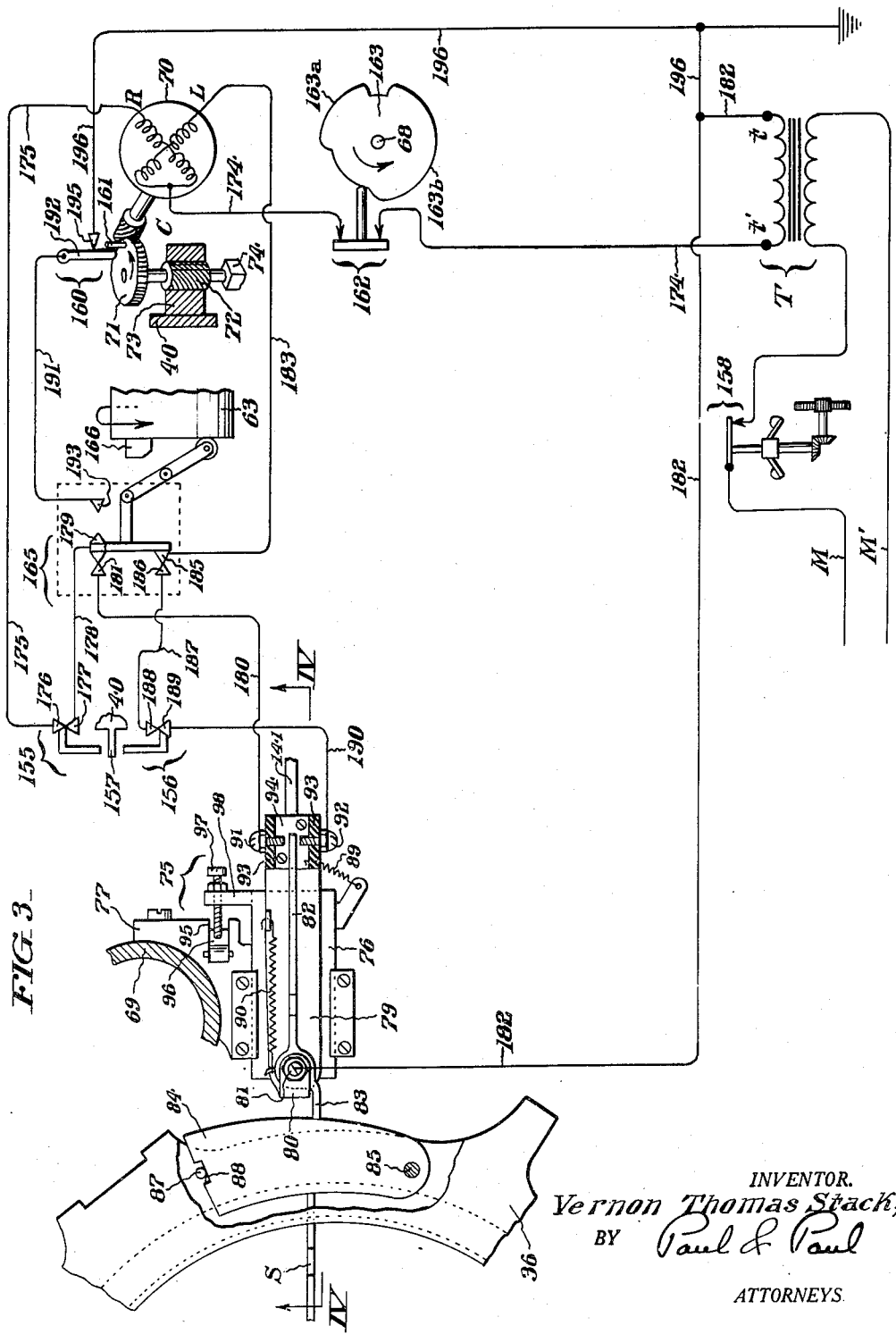
Fig. 3 is a fragmentary plan view, likewise on a larger scale, taken as indicated by the angled arrows III—III in Fig. 1, in connection with which is shown a wiring diagram including an electric motor and various switch devices embodied in the control mechanism.
Figure 4:
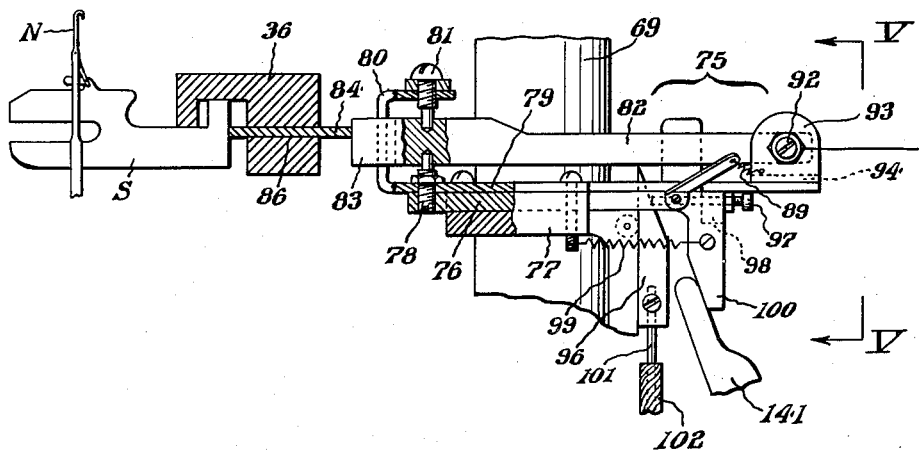
Fig. 4 is a detail sectional view on a still larger scale taken as indicated by the angled arrows IV—IV in Fig. 3.
Figure 5:
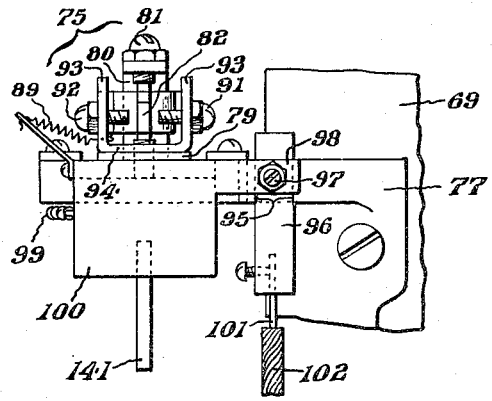
Fig. 5 is a fragmentary detail view in elevation looking as indicated by the angled arrows V—V in Fig. 4.

In adapting a knitting machine, such as above briefly described, to the purposes of my invention, I utilize a reversible electric motor 70 (Figs. 1, 2, 3 and 11) as a source of power for raising and lowering the needle cylinder 15 to vary the size of the fabric loops incident to knitting stocking blanks shaped as shown in Fig. 12, said motor being supported by a fixed bracket bolted to the base of the machine frame 18. Through speed reducing worm gearing 71, the motor 70 drives a finely threaded vertical axis screw 72 which engages into a tapped lateral lug projection 73 adjacent the bottom end of tube 40 and which is adapted to react upon a push block 74 on the base of the machine. During each stocking knitting cycle, the operation of motor 70 is controlled by a reversing detector switch comprehensively designated 75. As best shown in Figs. 3, 4 and 5, this switch 75 includes a slide 76 which is constrained to movement radially of needle cylinder 15 at the level of the sinker cam ring 36 in a guide bracket 77 affixed to post 69. Fulcrummed on an upright pivot stud 78 at the inner end of slide 76 is a member 79 with yoke projection 80 in which is secured a pivot stud 81 in axial alignment with stud 78. Supported, with capacity for independent swinging movement between the inner ends of the studs 78 and 81, is a contact finger 82 which is formed with a rearward projection 83 that bears against the outer convex edge of a rider element 84 fulcrummed at 85 within a slot 86 in the sinker cam ring 36, see Fig. 4, the inner edge of said rider element bearing, in turn, against outer ends of the sinkers S. A stop in 87 (Fig. 3) serves, by cooperation with a notch 88 in the distal end of the rider element 84, to limit the extent to which the latter can be moved. Springs respectively designated 89 and 90, tend to move the arm 79 and finger arm 82 clockwise independently about their common pivot axis. Normally, contact finger 82 occupies the neutral position in which it is shown in Fig. 3, with its distal end midway between and clear of a pair of opposedly arranged contacts 91 and 92 which are adjustably engaged in the upstanding side portions 93 of a bracket 94 of a dielectric material secured upon the outer end portion of arm 79. Guided in a vertical groove 95 in bracket 77 is a wedge cam 96 which is adapted to act upon a screw stud 97 adjustable in a lateral lug projection 98 on slide 76 to shift the latter outward, at times as later on explained, against the pull of the spring shown at 99 in Figs. 4 and 5, one end of said spring being anchored to a pendent projection 100 at the outer end of said slide.

Figure 2:
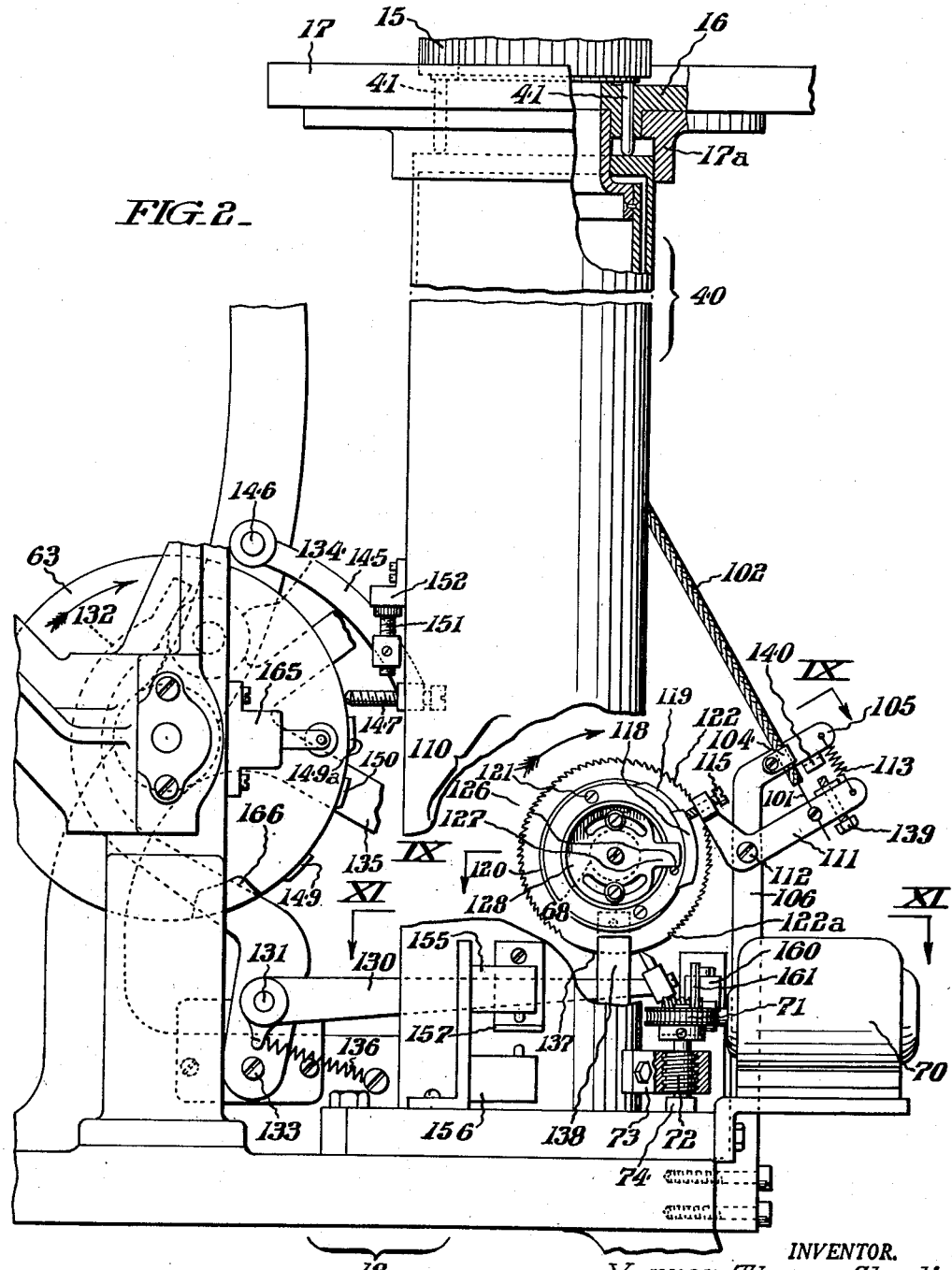
Fig. 2 is a fragmentary view of the machine in side elevation as seen from the left of Fig. 1, also with a portion broken out, drawn to a larger scale.

Through a "Bowden" wire 101 confined in a guide sheathing 102, affixed at 103 to the edge of bed 61 (Fig. 1) and at 104 to the projection 105 of a bracket 106 (Fig. 2) at the base of the machine frame 18, the wedge cam 96 is shifted up or down by the graduating mechanism comprehensively designated 110 in Figs. 1, 2 and 9. As shown, this graduating mechanism 110 includes a bell crank lever 111 which is fulcrumed at 112 on bracket 106. A spring 113 in tension between the bracket projection 105 and one arm of bell crank lever 111, yieldingly urges said lever counterclockwise in Fig. 2. Adjustable in the other arm of bell crank lever 111 are three screws 115, 116 and 117 (see Fig. 9), which are adapted to respectively engage, at different times, the peripheries of three cam ridges 118, 119 and 120. As shown in Figs. 2, 9 and 10, the cam ridges 118, 119 and 120 are secured, by screws 121, to one side face of a ratchet wheel 122 mounted at the left hand end of the shaft 68 (Fig. 1) of main timing drum 30. From Fig. 10 it will be observed that the curvature of cam ridge is spiral or eccentric to the axis of drum shaft 68. Extending laterally from the outer face of cam ridge 118 is a stud 126 which lies in the path of the finger projection 127 of a disk 128 secured, with capacity for circumferential adjustment, to the corresponding end of drum shaft 68. Ratchet wheel 122 is arranged to be picked by a pawl 130 pivotally connected at 131 to an arm 132 fulcrumed on a fixed pivot 133 at the base of frame 18, said arm being rocked by a roller 134 on the usual constantly moving gear quadrant 135 through which the needle cylinder 15 is oscillated during the heel and toe phases of the stocking knitting cycle. Pawl 130 is yieldingly urged upward by the spring shown at 136 in Fig. 2, with its end normally playing idly on the toothless void 137 of ratchet wheel 122, which latter is frictionally restrained against overthrow by a spring tongue 138. For a reason later on pointed out, movement of the bell crank lever 111 in one direction is restricted by engagement of an adjustable screw 139 on its tail end with a stop 140 on the projection 105 of bracket 106.

During the knitting of the heel and toe pockets of the stocking, detector switch mechanism 75 is retracted by means of an upright lever 141 medially fulcrumed at 142 at the edge of the top plate of the machine frame 10, see Fig. 1. As shown, the lower end of lever 141 is in the path of a stud projection 143 on the clutch shifting arm 28, and the upper end of said lever extends to the rear of the pendent lug 100 on the slide 76 of detector switch mechanism 75. Moreover, during heel and toe knitting, the size of the fabric loops is determined in the usual manner through an arm 145 which is fulcrumed at 146 on the machine frame. At its distal end, arm 145 carries adjustable screws 147 and 148 which lie in the path of cam lugs 149, 149a and 150 respectively on the periphery of auxiliary timing drum 63, and at an intermediate point, said arm carries another adjustable screw 151 which bears upwardly upon a lateral lug projection 152 on stocking receiving tube 40.

In addition to the detector switch mechanism 75, I have provided safety switches 155 and 156 (Figs. 1, 2 and 11) which are actuated by a lug projection 157 on the tube 40 to interrupt current flow to the motor 70 thereby to prevent raising or lowering of said column beyond predetermined limits; a master switch 158 (Figs. 1, 6 and 7) which is normally closed but which opens automatically when the machine stops; a switch 160 (Figs. 1, 2 and 11) adapted to be actuated by a stud 161 on worm wheel 71; a switch 162 (Figs. 1 and 8) adapted to be actuated by the lateral projection on a supplemental cam disk 163 on shaft 68 of main timing drum 30; and a circuit breaker or switch 165 (Figs. 1 and 2) adapted to be actuated by a lateral cam projection 166 on the supplemental timing drum 63.

As shown in Figs. 6 and 7, master switch 158 is supported by a post 165 upstanding from the top plate of the machine frame, and its movable contact 166 is arranged to be actuated by a fly ball governor 167 at the upper end of a vertical shaft 168 rotatively supported in a bearing bracket 169 affixed to the rear of said frame. Through a pair of intermeshing bevel bear pinions 170, shaft 168 is driven from a horizontal shaft 171 also journalled in bracket 169, the latter shaft having, at its inner end, a spur pinion 172 in mesh with the usual segment driving gear 173 of the machine.

The motor and the several switches are embodied, as diagrammatically illustrated in Fig. 3, in circuiting powered through a transformer T from mains M and MI leading from a suitable source of A. C. current supply. The voltage used in the stitch length size system of my invention is arbitrarily within limits commensurate with safety to the machine attendant, common ratings of fractional horse power motors, switches etc. For the purposes of exemplification, A. C. current at 115 volts delivered to transformer T is stepped down to say 24 volts for use in the motor circuits. As shown in Fig. 3, switch 162 is interposed in a conductor 174 which leads from one terminal of the secondary of transformer T to the terminal C of motor 70. Through a conductor 175, the terminal R of motor 70 is connected to the movable contact 176 of the "up" limit switch 155, the stationary contact 177 of the latter being in turn connected by a conductor 178 to the movable contact 179 of circuit breaker 165. Another conductor 180 connects the fixed contact 181 of switch 165 to the fixed contact 91 of detector switch 75. Leading from the pivot 81 of the detector switch finger 82 is a conductor 182 which extends to the other terminal of the secondary coil of transformer T. Through a conductor 183, the terminal L of motor 70 is connected to the movable contact 185 of circuit breaker 165, the stationary contact 186 of which latter is connected by a conductor 187 to the fixed contact 188 of "down" limit switch 156. As further shown, the movable contact 189 of the "down" limit switch 156 is connected by a conductor 190 to the fixed contact 92 of detector switch 75, and a conductor 191 connects the movable contact 192 of switch 160 with the movable contact 193 of circuit breaker 165. As further shown, the fixed contact 195 of switch 160 is connected by a conductor 196 to conductor 182. Master switch 158 is interposed, with the primary of transformer T, in power circuit M, MI.

Operation

Let it be assumed that the machine is dormant in Fig. 1, with belt 26 on idling pulley 23; with the tubular column 40 (and needle cylinder 15) in highest position; with screw 115 (Figs. 2, 9 and 10) on arm 111 resting upon cam 118; and with pawl 130 riding idly upon the void 137 of ratchet wheel 122, all in readiness for the formation of fabric loops of maximum size. As belt shipper 25 is shifted to transfer belt 26 to high speed pulley 21, the machine is started for rotary knitting, incident to which master switch 158 is closed by the action of ball governor 167 as in Fig. 3. Fabric for the welt top W of the stocking (Fig. 12) will then first be formed, and, upon its completion, the welt will be closed at the course I—I in the usual well known manner. If, during this phase of the knitting, the fabric loops should tend to tighten due to tension variations or inequalities in the yarn as it is fed to the needles, the sinkers S will move outward, such movement is communicated, through rider element 84 (Fig. 3), to finger 82 of detector switch 75 whereby the said finger will be swung counterclockwise into engagement with contact 91. As a consequence, electric current will flow from terminal t of the secondary coil of transformer T through conductor 182, finger 82 of detector switch 75, contact 91, conductor 180, contact 181 of closed switch 165, conductor 178, contacts 177 and 176 of closed upper limit switch 155, conductor 175, through coil R—C of motor 70 and closed switch 162 to the other terminal t' of the secondary coil of said transformer. Motor 70 will thereby be momentarily rotated in the proper direction to elevate tube 40 and needle cylinder 15 to the extent necessary for loop equalization. If, on the other hand, the fabric loops should tend to slacken or increase in size, rider element 84 will move inward with the sinkers S, with attendant swinging of the finger 82 of detector switch 75 clockwise in Fig. 3 by spring 90 into engagement with contact 92. When this happens, electric current will flow from terminal t of the secondary coil of transformer T through conductor 182, finger 82 of detector switch 75, contact 92, conductor 190, closed contacts 189, 188 of down limit switch 156, conductor 187, closed contacts 186, 185 of circuit breaker 165, conductor 183, coil L—C of motor 70, conductor 174 and closed switch 162 to terminal t' of the transformer secondary. Accordingly, under these circumstances, motor 70 will be reversely rotated momentarily to lower column 40 and needle cylinder 15 to the extent necessary for loop equalization. By a rotative shog of drum shaft 68 (Figs. 2, 9 and 10) at the completion and closing of the stocking welt W at course 1—1 (Fig. 12), ratchet wheel 122 is turned clockwise slightly to bring cam 119 thereon into the range of screw 116 on bell crank lever 111, which latter will thereby be moved counterclockwise slightly by the pull of spring 113 (Fig. 2) with the result that, through Bowden wire 101, wedge 96 (Fig. 4) will be shifted upward by a proportionate degree to correspondingly retract slide 76 of detector switch by a small distance and thereby bring about a small decrease in loop size for the knitting of the shadow welt W' of the stocking (Fig. 12). As slide 76 is so shifted, finger 82 of detector switch 75 (Fig. 3) will be swung by spring 90 into engagement with contact 91 so that the current will flow through coil L—C of motor 70 to rotate the latter momentarily in the proper direction to lower tube 40 and needle cylinder 15 to the extent required for the formation of somewhat smaller loops, whereupon the finger 82 of detector switch 75 will resume the normal neutral position in which it is shown in Fig. 3. Upon completion of the shadow welt W' (Fig. 12) at the course 2—2, drum shaft 68 (Figs. 2, 9 and 10) is given another rotative shog to bring the point $x$ of cam 120 into the range of screw 117 on bell crank lever 111, whereby detector switch 75 is re-set as before to determine the formation of still smaller loops during the knitting of the uniform diameter upper portion of the stocking boot to course 3—3. At course 3—3, the shaft 68 of main timing drum shaft 68 is given another rotary shog to bring the first tooth 122a of ratchet wheel 122 into the range of pawl 130. From then on, as screw 117 rides upon the eccentric cam 120, bell crank lever 111 will move counterclockwise incrementally as ratchet wheel 122 is picked and wedge cam 96 (Fig. 4) will be correspondingly raised, step by step, through the medium of Bowden wire 101, with the result that the fabric loops will be gradually decreased in size by progressive lowering of tube 40 and needle cylinder 15. The stocking leg will thus be tapered as shown in Fig. 12 to the course 4—4 which will be formed of loops of minimum size. By the time course 4—4 is reached, ratchet wheel 122 will have been picked through a distance such that the point $y$ of cam 120 is presented beneath screw 117 on bell crank lever 111, whereafter the stitch size during the knitting of the stocking ankle A to the course 5—6 in Fig. 12, will be determined by engagement of screw 139 on bell crank lever 111 with the stop 140 (Fig. 2) on bracket 108. In the interim, ratchet wheel 122 will be picked idly until it reassumes the normal dormant position in which it is shown in Fig. 10, in which position it will remain until called upon to function again for the next stocking. Thereupon, by another rotary shog of main timing drum 30 at the course 5—6, fork 28 (Fig. 1) is moved leftward to shift clutch 29 for initiation of an oscillatory phase of the machine to knit the stocking heel H in the usual way. Through movement of fork 28 as just explained and attendant actuation of lever 141, detector switch 75 is retracted from rider element 84 to leave the sinkers S free, and therefore does not function during heel knitting, the motor circuits in Fig. 3 having been opened by rise 163a of cam 163 incident to the last mentioned rotary shog of main timing drum shaft 68. During the heel knitting, the stitch length is determined by auxiliary timing drum 63 through conventional stitch regulating lever 145 and action of cam lug 149 against screw 147 (Figs. 1 and 2). By another rotary shog of main timing drum 30 upon completion of the stocking heel at the course 6—7 in Fig. 12, fork 28 is shifted rightward to the position of Fig. 1, to bring the machine back into rotation incident to which detector switch 75 is returned to the active position of Fig. 3 by spring 99 (Fig. 4) in readiness to operate during knitting of the stocking instep I. As this stage of the knitting is initiated, switch 162 is closed by rotary advance beyond it of the rise 163a of cam 163 to re-establish the motor circuits, the size of the loops being here determined in the same way as described in connection with the knitting of the ankle A. For the knitting of the advance toe ring U (Fig. 12), auxiliary timing drum 63 is given another rotary shog whereby its cam projection 150 is advanced beneath adjusting screw 149 on conventional stitch regulating lever 145 to position tube 40 and needle cylinder 15 as was previously done in preparation for heel knitting. At the completion of the toe ring U, timing drums 30 and 63 are again rotatively shogged whereby the machine is once more set into oscillation for the knitting of the stocking toe pocket P, detector swich 75 being incidently retracted to inoperative position and switch 162 opened by advance thereto of the rise 163b of cam 163, and column 40 positioned with needle cylinder by advance of cam projection 149a on drum 63 beneath screw 147 of the conventional stitch regulating lever 145. Upon completion of the toe pocket at the course 9—9, a few run-off or ravel courses L are knitted, incident to which the size of the loops is still determined by cam projection 149a on auxiliary cam drum. Since, at this time, the height of cylinder 15 will be above that at which the foot was knitted, the lower end of jack screw 72 (Fig. 2) will be above push block 74. Accordingly, it is necessary at this point to run motor 70 in clockwise direction to lower jack screw 72 to such position that when the run off is finished and cam projection 149a on drum 63 is advanced from beneath lever 145, said screw will be adjusted correctly for beginning the welt of new stocking. This resetting of jack screw 72 is accomplished as follows: As auxiliary drum 63 is given the rotary shog at the beginning of the run-off, cam projection 166 thereon is advanced to open the contacts of circuit breaker 165 to break the circuit connections between motor 70 and detector switch 75. By this action, contact 179 is moved into engagement with contact 193 so that raising coil R—C of motor 70 is still energized through gear limit switch 160 to rotate jack screw 72 clockwise until stud 161 on worm wheel 71 engages the movable contact of said switch and opens it to stop said motor. Stud 161 is so located on worm wheel 71 that switch 160 is opened when screw 72 has been rotated to correctly position tube 40 and needle cylinder 15 to determine the loop size for the welt of the next stocking. When drum 63 receives its final rotative shog at the end of the stocking knitting cycle, cam lug 166 is advanced beyond operating lever of circuit breaker 165 to allow opening of contacts 179 and 193 and reclosing of contacts 179, 181 and 185, 186, whereby the motor circuits are reset to the condition of Fig. 3. As has already been pointed out hereinbefore, the limit switches 155 and 156 are relied upon to open the motor circuit in the event that motor 70 should accidentally overrun in either direction. In this way the entire mechanism is protected against derangement and possible injury.

From the foregoing it will be realized that detector switch 75 will open and close many times during the knitting of a stocking in compensating for variations in yarn tension and in yarn size, and also incident to loop length changes as the stocking leg is being fashioned. In the basic diagram of Fig. 3, detector switch 75 is directly interposed in the reversing circuits of the motor 70, and is thus called upon to make and break the current supplied to the motor at full load at a relatively high potential—in the present exemplified instance at twenty-four volts. Under these circumstances, rapid wear of the contacts of detector switch 75 is apt to take place, requiring them to be frequently cleaned and readjusted for maintenance in reliable working condition.

This drawback I overcome in practise, as shown in the diagram of Fig. 13, by utilizing a pair of gaseous grid-controlled electron tubes 200, 200a, a pair of plate relay switches 201, 201a, and a pair of power relay switches 202, 202a. Finger 82 of detector switch 75 is connected, through conductors 203 and 204 to main M' of the power line, and contacts 91 and 92 of said detector switch are connected, by conductors 206 and 206a, to the grids of tubes 200 and 200a. The coils of relay switches 201 and 201a are interposed in the cathode plate circuits 207, 208, 208a and 207a of tubes 200, 200a, conductors 207, 207a, and are energized from the power line through conductors 209, 204 and 210 respectively. Conductors 211 and 211a leading from the contacts of plate relay switches 201, 201a are connected, through conductors 212 and 210, to the main M of the power line. As further shown, the coils of power relay switches 202 and 202a are connected by conductors 213 and 213a which, through a conductor 215, are connected to conductor 209. The fixed contacts of power relay switches 202, 202a are connected by conductors 216 and 216a which, in turn, are connected by a conductor 217 to terminal t of the secondary coil of transformer T. The movable contacts of power relay switches 202 and 202a are similarly connected respectively, through conductors 218 and 219, to the contacts 181 and 189 of switches 165 and 156 of the motor circuits which latter are otherwise identical with those of Fig. 3. Accordingly, in order to obviate the necessity for repetitive description, the component elements of the motor circuits in the alternative arrangement of Fig. 13 are identified by the same reference numerals previously employed.

The operation of the alternative embodiment is as follows: Let it be assumed that finger 82 of detector switch 75 has been moved into engagement with the fixed contact 91 of said switch. As a result, tube 200 will be fired by current flow from the power mains M, M' through circuit 204, 203, 82, 91, 206, 207 and 210, and thus permit current flow, in turn, in the cathode plate circuit 204, 209, 208, 207 and 210 of said tube. Through attendant closing of plate relay switch 201, circuit 204, 209, 215, 213, 211, 212 and 210 will be established through the coil of power relay switch 202. Current will thereupon flow from the secondary coil of transformer T through conductors 217, 216, 218, 178, 175 coil C—R of motor 70 closed switch 162 and conductor 174, and accordingly, said motor will be driven in one direction until finger 82 of detector switch is returned to its normal neutral position between contacts 91 and 92. In a similar manner, upon movement of finger 82 into engagement with contact 92, tube 200a will fire, with attendant closing of plate and power relay switches 201a, 202a and with establishment of the circuit through coil C—L of motor 70 whereby said motor is driven in the opposite direction, current flow in the latter instance being from the secondary of transformer T by way of conductors 217, 216a, 219, 187, 183 coil C—L, closed switch 162 and conductor 174. Since the grid currents of tubes 200 and 200a broken by detector switch are very small, it will be evident that the life and sensitivity of the contacts of said switch will be longer as compared to those in the arrangement of Fig. 3. The size and type of the contacts of power relays 202 and 202a will be selected, of course, to carry the required value of motor current at the interrupting frequency necessary.

Having thus described my invention, I claim:

1. Automatic stitch length control mechanism for a knitting machine having a grooved carrier with a complement of independent needles and supporting a complement of cooperative slide sinkers, and knitting cams for actuating the needles, said mechanism including reversible motor means for moving the carrier and the knitting cams relatively to increase or decrease the distance between the sinker level and the cams; and a detector means influenced by the sinkers for governing the motor means to so move the carrier and the cams relatively and thereby compensate for irregularities in the yarn or in the tension thereon as it is fed to the needles for maintenance of uniform loop size in individual courses of the fabric produced by the machine.

2. The invention according to claim 1, further including means for bodily moving the detector means either toward or from the carrier to effect each time, through the governing means, a greater movement as between the carrier and the cams and, in turn, a corresponding change in the size of the loops for different individual courses of the fabric.

3. The invention according to claim 1, further including means for periodically moving the detector means bodily either toward or from the carrier to effect, through the governing means, greater movements as between the carrier and the cams and, in turn, corresponding changes in the size of the loops for different individual courses of the fabric.

4. The invention according to claim 1, further including means for periodically moving the detector means bodily either toward or from the carrier but always in one direction, to effect, through the governing means, greater movements as between the carrier and the cams and, in turn, corresponding changes in the size of the loops in successive courses of the fabric.

5. Automatic stitch length control mechanism for a knitting machine having a grooved cylinder with a complement of independent needles and supporting a complement of cooperative slide sinkers, and knitting cams for actuating the needles, said mechanism including a detector means influenced by the sinkers in the event of any tendency of the fabric loops to tighten or slacken; and means governed by the detector means for changing the vertical relationship between the needle cylinder and the knitting cams as may be required for maintenance of a uniform loop size in individual courses of the fabric produced by the machine.

6. The invention according to claim 5, further including means for bodily moving the detector means radially toward or away from the needle cylinder to effect, through the governed means, a greater change in the vertical relationship between the needle cylinder and the knitting cams and, in turn, a corresponding change in the size of the loops for individual courses of the fabric.

7. The invention according to claim 5, further including means for bodily moving the detector either toward or away from the needle cylinder to effect each time through the governed means, a greater change in the vertical relationship between the needle cylinder and the knitting cams and, in turn, a corresponding change in the size of the loops for different individual courses of the fabric.

8. The invention according to claim 5, further including means for bodily moving the detector means periodically either toward or away from the needle cylinder but always in one direction to effect each time through the controlled means, a greater change in the vertical relationship between the needle cylinder and the knitting cams for graduation of the size as between successive courses of the fabric as it is being knitted.

9. Automatic stitch length control mechanism for a knitting machine having a cylinder with a complement of independent needles, a complement of cooperative slide sinkers supported by the cylinder and knitting cams for actuating the needles, said mechanism including detector means influenced by the sinkers in the event of any tendency of the fabric loops to tighten or slacken, and means governed by the detector for axially moving the cylinder up or down relative to the knitting cams as may be required for maintenance of a uniform loop size in individual courses of the fabric produced by the machine.

10. The invention according to claim 9, further including timing means for shifting the detector means bodily toward or away from the cylinder radially to effect each time a greater axial movement of the cylinder relative to the cams and, in turn, a corresponding change in the size of the loops for different individual courses of the fabric.

11. Automatic stitch length control mechanism for a kitting machine having a grooved cylinder with a complement of independent needles and a complement of cooperative slide sinkers supported by the cylinder, and knitting cams for actuating the needles, said mechanism including a reversible electric motor; interposed means actuated by the motor for changing the vertical relationship between the cylinder and the knitting cams; a normally open reversing detector switch in circuit with the motor influenced by the sinkers to cause the motor to be driven in one direction or the other as may be required for maintenance of uniform loop size in individual courses of the fabric produced by the machine.

12. The invention according to claim 11, further including means for bodily moving the detector switch radially either toward or away from the needle cylinder to effect, through the motor, a greater change in the vertical relationship between the needle cylinder and the knitting cams and, in turn, a corresponding change in the size of the loops for different individual courses of the fabric.

13. The invention according to claim 11, further including means for bodily moving the detector switch radially either toward or away from the needle cylinder periodically but always in one direction to effect each time, through the motor, a greater change in the vertical relationship between the needle cylinder and the knitting cams and, in turn, a corresponding change in the size of the loops in successive courses of the fabric.

14. Stitch length control mechanism for a circular knitting machine having cylinder with a complement of independent needles and a complement of cooperative radially sliding sinkers supported by the cylinder and knitting cams for actuating the needles, said mechanism including a reversible electric motor; interposed means actuated by the motor for changing the vertical relationship between the cylinder and the knitting cams; a rider element engaged with the sinkers; a normally open reversing detector switch in circuit with the motor and having its actuating member bearing against the rider element whereby, as the switch is shifted toward the cylinder, the motor is momentarily rotated in one direction and whereby when the switch is shifted away from the cylinder, the motor is momentarily driven in the opposite direction for maintenance of a uniform loop size in individual courses of the fabric produced by the machine.

15. Stitch length control mechanism for a circular knitting machine according to claim 14, further including means for moving the detector switch bodily toward or away from the cylinder to effect through the motor greater relative movements as between the cylinder and the cams and a corresponding increase or decrease in the size of the loops in individual courses of the fabric produced by the machine.

16. Stitch length control mechanism for a circular knitting machine according to claim 14, further including spring means tending to retract the switch relative to the rider element; a wedge cam for restraining the switch; and means for moving the wedge cam in one direction or the other whereby the switch is bodily shifted correspondingly to effect, through the motor, greater relative movements as between the cylinder and the cams for increase or decrease in the size of the loops in individual courses of the fabric produced by the machine.

17. Stitch length control mechanism for a circular knitting machine according to claim 14, further including spring means tending to retract the switch relative to the rider element; a wedge cam for restraining the switch; and means for periodically moving the switch cam in one direction whereby the switch is correspondingly shifted bodily to effect, through the motor, greater relative movements as between the cylinder and the knitting cams for progressive graduation of the size of the loops as between successive courses of the fabric produced by the machine.

18. Stitch length control mechanism for a circular knitting machine having a grooved rotary cylinder with a complement of independent needles and a complement of cooperative slide sinkers constrained to radial movement in a ring on the cylinder, stationarily supported cams for actuating the needles, and a vertically movable fabric receiving tube atop of which the cylinder is sustained, said mechanism including a vertical axis jack screw in threaded engagement with a lateral lug projection on the fabric receiving tube; a reversible motor for rotating the jack screw; and a detector means influenced by the sinkers in the event of any tendency of the fabric loops to tighten or slacken; and interposed means by which the motor is caused to rotate in one direction or the other and thereby raise or lower the fabric receiving tube and the needle cylinder together, through the jack screw, as may be required for maintenance of uniform loop size in individual courses of the fabric produced by the machine.

19. Stitch length control mechanism for a circular knitting machine according to claim 18, wherein the bottom end of the jack screw bears upon a fixed part of the machine; wherein a worm wheel at the top of said screw is in mesh with a worm on the shaft of the motor; and wherein the motor is fixedly supported.

20. Stitch length control mechanism for a circular knitting machine according to claim 18, wherein the motor is of a reversible electric type, and wherein the detector means is in the form of a reversing switch in circuit with said motor.

21. Stitch length control mechanism for a circular knitting machine according to claim 18, wherein the motor is of a reversible electric type, and wherein the detector means is in the form of a reversing switch in circuit with the motor, and further including means for shifting the switch bodily toward or away from the needle cylinder by greater amounts to effect through the motor and the jack screw correspondingly greater up or down movements of the cylinder and increase or decrease in the size of the loops in individual courses of the fabric.

22. Stitch length control mechanism for a circular stocking knitting machine having a grooved cylinder with a complement of independent needles and a complement of cooperative slide sinkers constrained to radial movement in a ring around the cylinder, stationarily supported cams for actuating the needles, means for rotating and oscillating the cylinder, means by which the cylinder is sustained with capacity for up and down movement relative to the cams; means for holding the cylinder at a definite level to determine the size of the fabric loops during knitting of the heel and toe pockets of a stocking, said mechanism including a detector means influenced by the sinkers in the event of any tendency of the fabric loops to tighten or slacken during the rotary phases of the knitting; a reversible motor means governed by the detector means for moving the cylinder up or down to the extent necessary for maintenance of uniform loop size in individual courses of the fabric during the rotary phases of the knitting; and means for retracting the detector means to prevent it from functioning during the oscillatory phases of the knitting.

23. Stitch length control mechanism for a circular stocking knitting machine according to claim 22, wherein the detector means is in the form of a reversing switch; wherein the motor means is in the form of a reversible electric motor in circuit with the detector switch; and further including a normally closed cut out switch also interposed in the circuit, and means for opening the cut out switch incident to retraction of the detector means to prevent it from functioning during the oscillatory phases of the knitting.

24. Stitch length control mechanism for a circular stocking knitting machine according to claim 22, further including means for bodily moving the detector means periodically relative to the needle cylinder to effect each time, through the governed means, a greater axial movement of the cylinder for progressive decrease in the size of the loops in successive courses of the fabric during the knitting of the boot portion of the stocking.

25. Stitch length control mechanism for a circular stocking knitting machine according to claim 24, wherein the detector means is in the form of a reversing switch; wherein the motor means is in the form of a reversible electric motor in circuit with the detector switch; and wherein the means for bodily moving the detector switch periodically comprises a shiftable wedge cam against which said switch is yieldingly urged by a spring, and an intermittently rotated spiral cam with a follower bearing thereon, and an interposed actuating connection between the finger and the wedge cam.

26. Automatic stitch length control mechanism for a knitting machine having a cylinder with a complement of needles and with a complement of slide sinkers, and knitting cams for actuating the needles, said mechanism including a reversible A. C. electric motor with forward and reverse drive coils; interposed instrumentalities actuated by the motor for changing the vertical relationship between the cylinder and the knitting cams; a normally open reversing detector switch having a finger which, under the influence of the sinkers, is adapted to be moved into engagement with one or the other of a pair of contacts, said finger being connected to one side of an A. C. power line; normally open relay switches interposed with forward and reverse drive coils of the motor, in separate circuits energized from the secondary coil of the transformer in the power line; a pair of gaseous grid-controlled electron tubes with their cathodes and plates respectively in separate circuits energized from the power line and with their grids connected respectively to the fixed contacts of the detector switch; normally open plate relay switches respectively interposed with the respective coils of the power relay switches in separate circuits connected to the power line, the coils of said plate relays being interposed respectively in the cathode-plate circuits of the electron tubes, all operative as and for the purpose set forth.

References Cited in the file of this patent

UNITED STATES PATENTS

| Number | Name | Date |
|---|---|---|
| 2,516,535 | Stack | July 25, 1950 |
| 2,613,692 | Anderson | Oct. 14, 1952 |